US008355901B2

(12) United States Patent  (10) Patent No.: US 8,355,901 B2
Hieda  (45) Date of Patent: Jan. 15, 2013

(54) CPU EMULATION SYSTEM, CPU EMULATION METHOD, AND RECORDING MEDIUM HAVING A CPU EMULATION PROGRAM RECORDED THEREON

(75) Inventor: Satoshi Hieda, Tokyo (JP)

(73) Assignee: NEC Corporation, Tokyo (JP)

( * ) Notice: Subject to any disclaimer, the term of this patent is extended or adjusted under 35 U.S.C. 154(b) by 425 days.

(21) Appl. No.: 12/607,479

(22) Filed: Oct. 28, 2009

(65) Prior Publication Data

US 2010/0106479 A1   Apr. 29, 2010

(30) Foreign Application Priority Data

Oct. 28, 2008   (JP) ................................. 2008-277098

(51) Int. Cl.
*G06F 7/60* (2006.01)
*G06F 17/10* (2006.01)
*G06F 9/455* (2006.01)
*G06F 9/46* (2006.01)

(52) U.S. Cl. ............... 703/26; 703/2; 718/101; 718/105
(58) Field of Classification Search .................... 703/26, 703/2; 718/101, 105
See application file for complete search history.

(56) References Cited

U.S. PATENT DOCUMENTS

| 6,164,841 | A  | * | 12/2000 | Mattson et al. | ............... | 716/103 |
| 7,802,073 | B1 | * | 9/2010 | Cheng et al. | .................. | 712/10 |
| 7,898,545 | B1 | * | 3/2011 | Alben et al. | ................. | 345/519 |
| 7,953,588 | B2 | * | 5/2011 | Altman et al. | ................. | 703/24 |
| 8,108,863 | B2 | * | 1/2012 | Rakvic et al. | ................ | 718/102 |
| 2004/0015888 | A1 | * | 1/2004 | Fujii et al. | ..................... | 717/136 |
| 2004/0054992 | A1 | * | 3/2004 | Nair et al. | ...................... | 717/138 |
| 2009/0049220 | A1 | * | 2/2009 | Conti et al. | ................... | 710/267 |
| 2009/0276771 | A1 | * | 11/2009 | Nickolov et al. | ............ | 717/177 |

FOREIGN PATENT DOCUMENTS

JP   2002-312180 A   10/2002
JP   2004-110824 A   4/2004

OTHER PUBLICATIONS

Hewlett Packard, NPL publication "Enabling optimizations to achieve higher performance on the HP PA-RISC Architecture", version 1 1997.*
Y. Zhang, NPL publication "Improving Parallel Job Scheduling by Combining Gang Scheduling and Backfilling Techniques", 2000, IEEE.*
Sivaram Shunmugam, "Cloud Computing with Red Hat Solutions", Sep. 15, 2008.*

\* cited by examiner

*Primary Examiner* — David Silver
*Assistant Examiner* — Angel Calle
(74) *Attorney, Agent, or Firm* — Scully, Scott, Murphy & Presser, P.C.

(57) ABSTRACT

A CPU emulation system includes; a plurality of virtual CPUs each operating on a different physical CPU; an instruction sequence selecting section for selecting an instruction sequence to be optimized; a virtual CPU selecting section for selecting one of the plurality of virtual CPUs, which is to perform optimization processing of the selected instruction sequence, based on usage rates of the plurality of virtual CPUs; and an optimization level selecting section for determining an optimization level of the optimization processing that is to be executed by the selected one of the plurality of virtual CPUs, and giving a direction to perform the optimization processing to the selected one of the plurality of virtual CPUs.

4 Claims, 10 Drawing Sheets

[INSTRUCTION SEQUENCE ASSOCIATION MANAGEMENT SECTION DURING PERIOD BETWEEN $T_1$ AND $T_2$]

| UNTRANSLATED INSTRUCTION SEQUENCE | TRANSLATED INSTRUCTION SEQUENCE | OPTIMIZED INSTRUCTION SEQUENCE |
|---|---|---|
| ... | ... | ... |
| α | β | $\gamma_1(O1)$ |
| ... | ... | ... |

FIG. 10A

[INSTRUCTION SEQUENCE ASSOCIATION MANAGEMENT SECTION AFTER $T_2$]

| UNTRANSLATED INSTRUCTION SEQUENCE | TRANSLATED INSTRUCTION SEQUENCE | OPTIMIZED INSTRUCTION SEQUENCE |
|---|---|---|
| ... | ... | ... |
| α | β | $\gamma_1(O1), \gamma_2(O2)$ |
| ... | ... | ... |

FIG. 10B

CPU EMULATION SYSTEM, CPU EMULATION METHOD, AND RECORDING MEDIUM HAVING A CPU EMULATION PROGRAM RECORDED THEREON

This application is based upon and claims the benefit of priority from Japanese patent application No. 2008-277098, filed on Oct. 28, 2008, the disclosure of which is incorporated herein in its entirety by reference.

BACKGROUND OF THE INVENTION

1. Field of the Invention

This invention relates to a CPU emulation system, a CPU emulation method, and a recording medium having a CPU emulation program recorded thereon. In particular, this invention relates to a CPU emulation system, a CPU emulation method, and a recording medium having a CPU emulation program recorded thereon, which are capable of performing, with the use of a multiprocessor, optimization processing of an instruction sequence without delaying instruction sequence execution processing.

2. Description of the Related Art

A CPU emulation system is a system for software-emulating a physical CPU to implement, as a virtual CPU, a CPU having an instruction set architecture (ISA) different from that of the physical CPU. The virtual CPU reads an instruction sequence for the ISA, which is manageable by the virtual CPU, and, after translating the read instruction sequence into an instruction sequence executable on the physical CPU, executes the translated instruction sequence.

As such a CPU emulation system, Japanese Unexamined Patent Application Publication (JP-A) No. 2002-312180 A (Hereinafter, referred to as Patent Document 1) discloses a CPU emulation system that uses a multiprocessor.

In the CPU emulation system including a plurality of processors described in Patent Document 1, processing of prefetching an original instruction, processing of interpreting and executing an original instruction sequence, and processing of translating and optimizing an instruction sequence are each executed on a different CPU. By separating a CPU for executing an instruction sequence from a CPU for performing optimization of the instruction sequence in this manner, the optimization processing of the instruction sequence is made to have no adverse effect on processing throughput of the instruction sequence execution processing.

Further, Japanese Unexamined Patent Application Publication (JP-A) No. 2004-110824 (Hereinafter, referred to as Patent Document 2) discloses an instruction sequence optimization system that uses a multiprocessor. According to Patent Document 2, with regard to a program that is being executed on one CPU, profile information thereon is collected, and, based on that information, the instruction sequence is optimized on another CPU during the execution. By separating a CPU for executing an instruction sequence from a CPU for optimizing the instruction sequence in this manner, the optimization processing of the instruction sequence is made to have no adverse effect on processing throughput of the instruction sequence execution processing.

SUMMARY OF THE INVENTION

The existing technologies have failed to utilize the idle time of a CPU efficiently. This is because those technologies are based on the assumption that execution processing of an instruction sequence and optimization processing of the instruction sequence are executed on different CPUs from each other in order to prevent those processings from having adverse effects on each other's performance throughput.

This invention has been made in view of the above-mentioned problem inherent in the existing technologies, and therefore it is an object thereof to make it possible to perform the optimization processing of an instruction sequence according to the usage rates of CPUs.

According to this invention, a CPU emulation system includes:

a plurality of virtual CPUs each operating on a different physical CPU;

an instruction sequence selecting section for selecting an instruction sequence to be optimized;

a virtual CPU selecting section for selecting one of the plurality of virtual CPUs, which is to perform optimization processing of the selected instruction sequence, based on usage rates of the plurality of virtual CPUs; and an optimization level selecting section for determining an optimization level of the optimization processing that is to be executed by the selected one of the plurality of virtual CPUs, and giving a direction to perform the optimization processing to the selected one of the plurality of virtual CPUs.

Further, according to this invention, another CPU emulation system includes:

an instruction sequence association management section for managing association among an untranslated instruction sequence, a translated instruction sequence, and an optimized instruction sequence, the untranslated instruction sequence being an instruction sequence before architecture translation processing, the translated instruction sequence being an instruction sequence obtained by translating the untranslated instruction sequence into a format executable on a physical CPU, the optimized instruction sequence being an instruction sequence obtained by subjecting the translated instruction sequence to optimization processing;

a plurality of virtual CPUs each operating on a different physical CPU;

an instruction sequence selecting section for selecting an instruction sequence to be optimized;

an optimization direction section for giving directions to perform the optimization processing of the selected instruction sequence to the plurality of virtual CPUs, the directions specifying different optimization levels among the plurality of virtual CPUs; and an optimization information writing section for writing, upon completion of the optimization processing by one of the plurality of virtual CPUs, information on the optimized instruction sequence thus obtained into the instruction sequence association management section in association with the translated instruction sequence that is a source of the optimized instruction sequence.

Further, according to this invention, a CPU emulation method includes:

selecting an instruction sequence to be optimized;

selecting, based on usage rates of a plurality of virtual CPUs each operating on a different physical CPU, one of the plurality of virtual CPUs, which is to perform optimization processing of the selected instruction sequence;

determining an optimization level of the optimization processing that is to be executed by the selected one of the plurality of virtual CPUs; and giving a direction to perform the optimization processing to the selected one of the plurality of virtual CPUs.

Further, according to this invention, another CPU emulation method includes:

selecting an instruction sequence to be optimized;

giving a plurality of virtual CPUs directions to perform optimization processing at different optimization levels with regard to the selected instruction sequence; and writing, upon completion of the optimization processing by one of the plurality of virtual CPUs, information on an optimized instruction sequence thus obtained into an instruction sequence association management section in association with a translated instruction sequence that is a source of the optimized instruction sequence.

Further, according to this invention, a recording medium has a CPU emulation program recorded thereon, the CPU emulation program causing a computer to execute the processings of:

selecting an instruction sequence to be optimized;

selecting, based on usage rates of a plurality of virtual CPUs each operating on a different physical CPU, one of the plurality of virtual CPUs, which is to perform optimization processing of the selected instruction sequence; and giving a direction to perform the optimization processing to the selected one of the plurality of virtual CPUs after determining an optimization level of the optimization processing that is to be executed by the selected one of the plurality of virtual CPUs.

Further, according to this invention, a recording medium has another CPU emulation program recorded thereon, the another CPU emulation program causing a computer to execute the processings of:

selecting an instruction sequence to be optimized;

giving a plurality of virtual CPUs directions to perform optimization processing at different optimization levels with regard to the selected instruction sequence; and writing, upon completion of the optimization processing by one of the plurality of virtual CPUs, information on an optimized instruction sequence thus obtained into an instruction sequence association management section in association with a translated instruction sequence that is a source of the optimized instruction sequence.

BRIEF DESCRIPTION OF THE DRAWINGS

FIG. 10A is a diagram illustrating an instruction sequence association management section during a period between $T_1$ and $T_2$ according to the third example of this invention; and FIG. 10B is a diagram illustrating the instruction sequence association management section after $T_2$ according to the third example of this invention.

DETAILED DESCRIPTION OF THE PREFERRED EMBODIMENTS

First Embodiment

With reference to the drawings, detailed description is given of a first embodiment of this invention.

Here, in a CPU emulation system, the following processing is mainly performed: an instruction sequence for an instruction set architecture (ISA), which is manageable by a virtual CPU, is read; the instruction sequence thus read is then translated into an instruction sequence executable on a physical CPU; and the translated instruction sequence is executed. Of the above-mentioned processing, this invention relates to optimization processing of a translated instruction sequence, and hence, hereinbelow, description is given mainly of the optimization processing of an instruction sequence.

Figure 1:
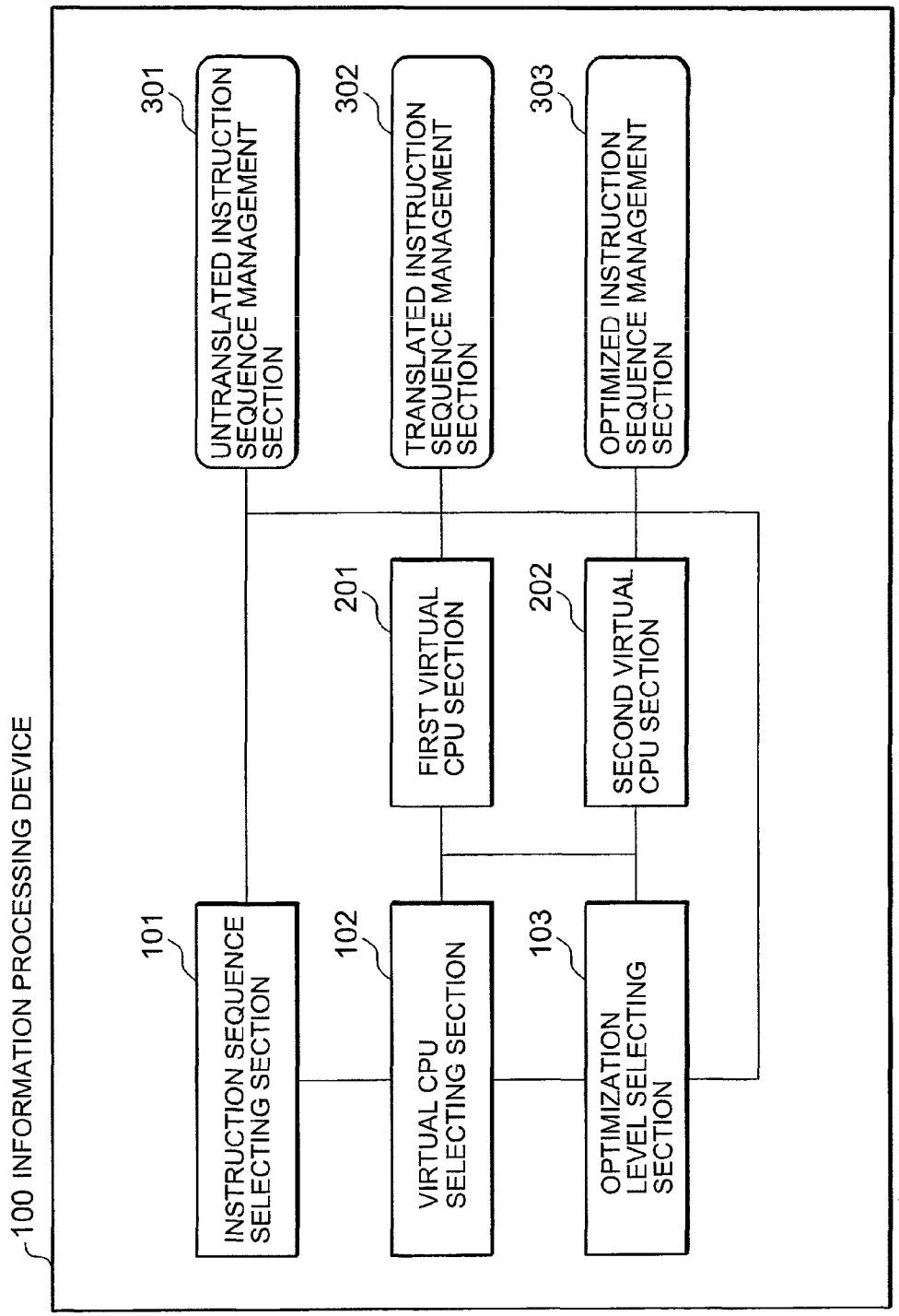
FIG. 1 is a block diagram illustrating a configuration of a first embodiment of this invention.

First, referring to FIG. 1, according to the first embodiment of this invention, an information processing device 100 includes an instruction sequence selecting section 101, a virtual CPU selecting section 102, an optimization level selecting section 103, a first virtual CPU section 201, a second virtual CPU section 202, an untranslated instruction sequence management section 301, a translated instruction sequence management section 302, and an optimized instruction sequence management section 303.

The untranslated instruction sequence management section 301 is a storage area for managing an instruction sequence for the ISA, which is manageable by the virtual CPU, that is, a storage area for managing an instruction sequence to be emulated. It should be noted that the instruction sequence to be emulated is hereinbelow referred to as an untranslated instruction sequence.

The translated instruction sequence management section 302 is a storage area for storing an instruction sequence translated through the above-mentioned instruction sequence translation processing. The translated instruction sequence management section 302 further manages, for each translated instruction sequence, an optimization level adopted in the instruction sequence translation processing. This configuration is based on the assumption that the optimization processing is performed to some extent in the instruction sequence translation processing as well. It should be noted that an instruction sequence translated through the instruction sequence translation processing is hereinbelow referred to as a translated instruction sequence.

The optimized instruction sequence management section 303 is a storage area for storing an instruction sequence that has been subjected to the optimization processing. It should be noted that an instruction sequence that has been subjected to the optimization processing is hereinbelow referred to as an optimized instruction sequence.

The instruction sequence selecting section 101 selects an instruction sequence to be optimized next in the CPU emulation system. The virtual CPU selecting section 102 selects a virtual CPU having a low usage rate as a virtual CPU that is to perform the optimization processing of the instruction sequence.

The optimization level selecting section 103 determines an optimization level of the optimization processing to be executed on the selected virtual CPU. The optimization level selecting section 103 refers to the translated instruction sequence management section 302 to acquire the optimization level that has been adopted to the selected instruction sequence in the instruction sequence translation processing, and then selects an optimization level higher than the acquired optimization level.

The first virtual CPU section 201 and the second virtual CPU section 202 are CPU functions provided by the CPU emulation system, and are executed on physical CPUs. The first virtual CPU section 201 and the second virtual CPU section 202 read an untranslated instruction sequence stored in the untranslated instruction sequence management section 301, and then translate the untranslated instruction sequence into an instruction sequence executable on the physical CPUs. It should be noted that the instruction sequence thus translated is stored, as the translated instruction sequence, in the translated instruction sequence management section 302, and can be used repeatedly when the same instruction sequence is executed again.

Further, the first virtual CPU section 201 and the second virtual CPU section 202 execute the translated instruction sequence on the physical CPUs.

Further, the first virtual CPU section 201 and the second virtual CPU section 202 perform the optimization processing of the translated instruction sequence according to a direction given from the optimization level selecting section 103. Specifically, after the instruction sequence to which the direction has been given is analyzed, the instructions are rearranged or translated for such purposes as enhancing execution speed for the instruction sequence, suppressing the amount of memory usage for the instruction sequence, and increasing a cache hit rate. The instruction sequence generated through the optimization processing is the optimized instruction sequence. It should be noted that the first virtual CPU section 201 and the second virtual CPU section 202 are executed on different physical CPUs or on different CPU cores of a multi-core processor.

Figure 2:
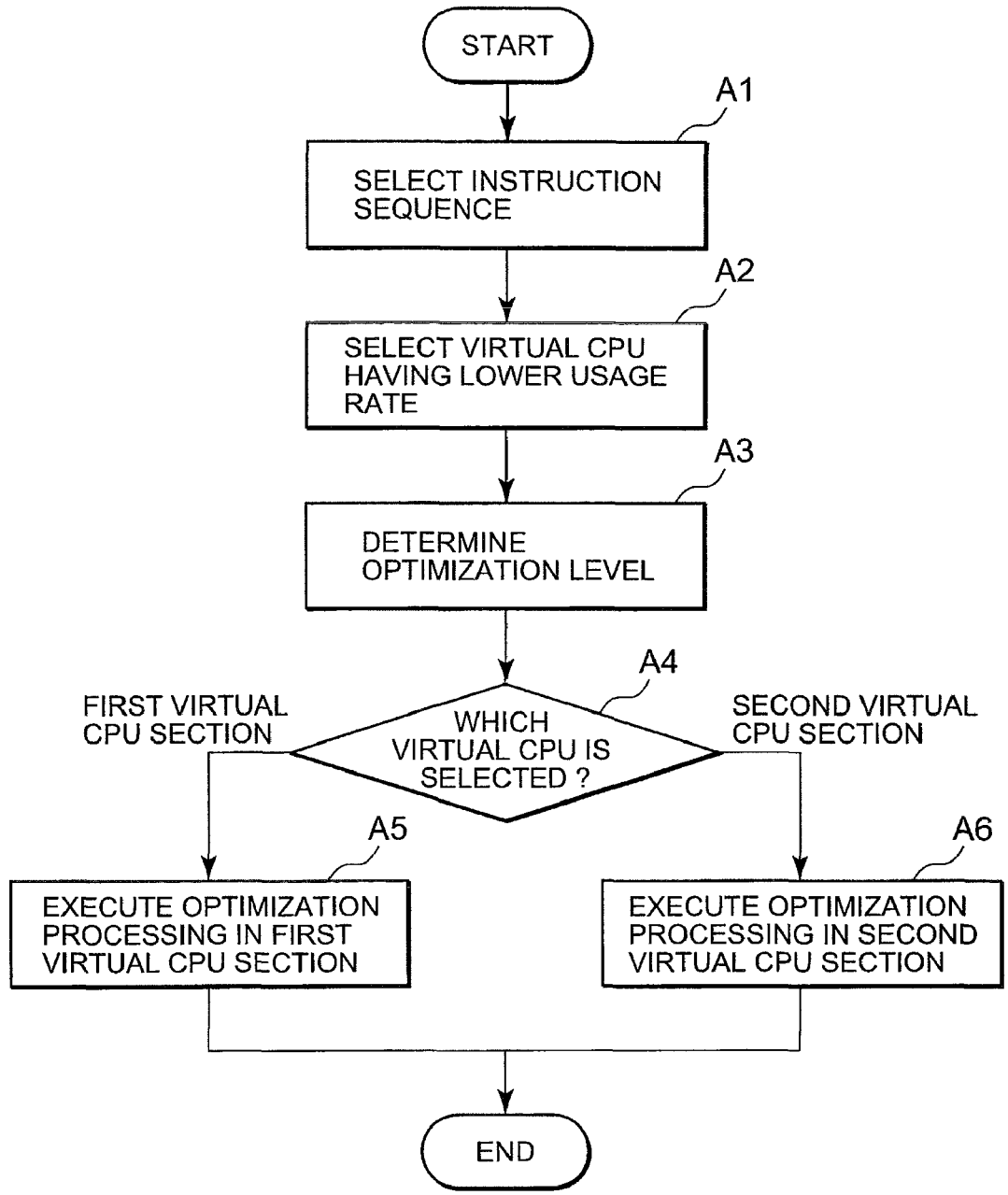
FIG. 2 is a flow chart illustrating operation of the first embodiment of this invention.

Next, with reference to FIG. 1 and a flow chart of FIG. 2, description is given of overall operation of this embodiment.

First, the instruction sequence selecting section 101 selects an instruction sequence to be optimized from among the translated instruction sequences stored in the translated instruction sequence management section 302 (Step A1 of FIG. 2).

Next, the virtual CPU selecting section 102 monitors the first virtual CPU section 201 and the second virtual CPU section 202 to select a virtual CPU having the lower usage rate as a virtual CPU that is to perform the optimization (Step A2).

Next, the optimization level selecting section 103 refers to the translated instruction sequence management section 302 to determine an optimization level to be adopted to the selected instruction sequence, and then gives a direction specifying the selected instruction sequence and optimization level to the selected virtual CPU (Step A3).

On this occasion, in a case where the first virtual CPU section 201 is selected (Step A4), the first virtual CPU section 201 performs the optimization processing of the instruction sequence according to the direction (Step A5).

In a case where the second virtual CPU section 202 is selected, the second virtual CPU section 202 performs the optimization processing according to the direction (Step A6).

According to the first embodiment of this invention, there is employed a configuration in which a virtual CPU section that is to perform the optimization processing is selected based on the usage rates of virtual CPUs. As a result, a virtual CPU section having a high usage rate is not given a direction to perform the optimization processing, and hence it is possible to execute the essential processing of translating/executing an instruction sequence without delay.

Second Embodiment

Next, with reference to the drawings, detailed description is given of a second embodiment of this invention.

Figure 3:
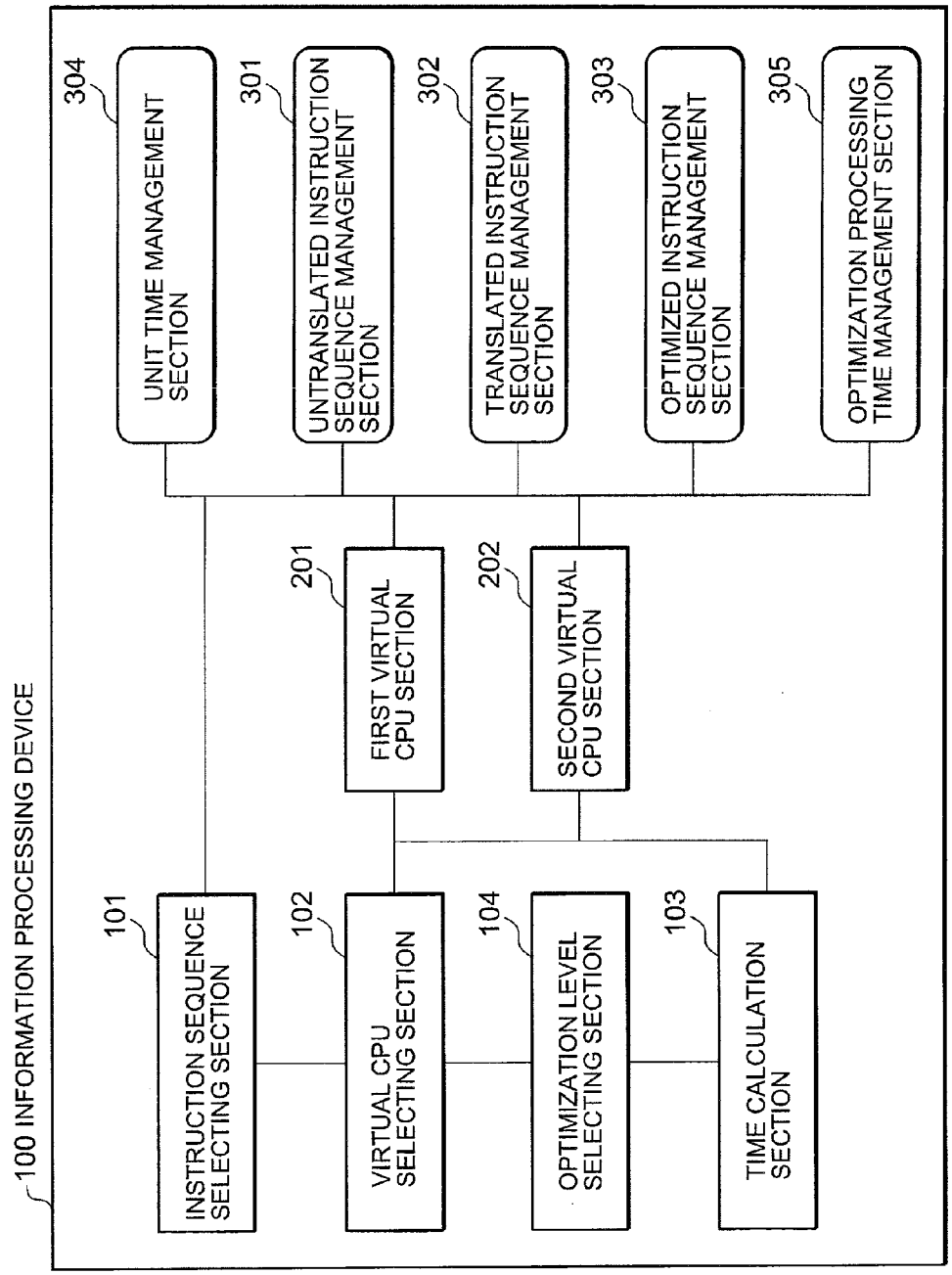
FIG. 3 is a block diagram illustrating a configuration of a second embodiment of this invention.

With reference to FIG. 3, this embodiment is different from the first embodiment in that a unit time management section 304, an optimization processing time management section 305, and a time calculation section 104 are provided. However, the rest of the configuration is the same as in the first embodiment. Hence, only differences in configuration are described here.

The unit time management section 304 is a storage area in which a given time length is stored as a unit time. The unit time is used for calculating an idle time of a virtual CPU based on the usage rate of the virtual CPU expressed in percentage. For example, when the usage rate of the first virtual CPU section 201 is 90% with the unit time being one second, the first virtual CPU section 201 is considered as being used for 900 milliseconds and being in an idle state for 100 milliseconds.

The optimization processing time management section 305 is a storage area in which a length of time to be required for the optimization processing is stored for each optimization level. For example, there is stored information indicating that an optimization level O1 takes 10 milliseconds for each instruction sequence of 100 bytes and that an optimization level O2 takes 20 milliseconds for each instruction sequence of 100 bytes.

First, the time calculation section 104 calculates an allowable time length that can be used for the optimization processing according to the usage rate of the virtual CPU selected by the virtual CPU selecting section 102 and the unit time management section 304. For example, when the usage rate of the first virtual CPU section 201 is 90% with the unit time being one second, the first virtual CPU section 201 is in the idle state for 100 milliseconds, and hence the time calculation section 104 obtains 100 milliseconds through calculation as the allowable time length for the optimization processing. Next, the time calculation section 104 refers to the optimization processing time management section 305, to thereby calculate a time length to be required for the optimization processing of the specified instruction sequence for each optimization level.

Figure 4:
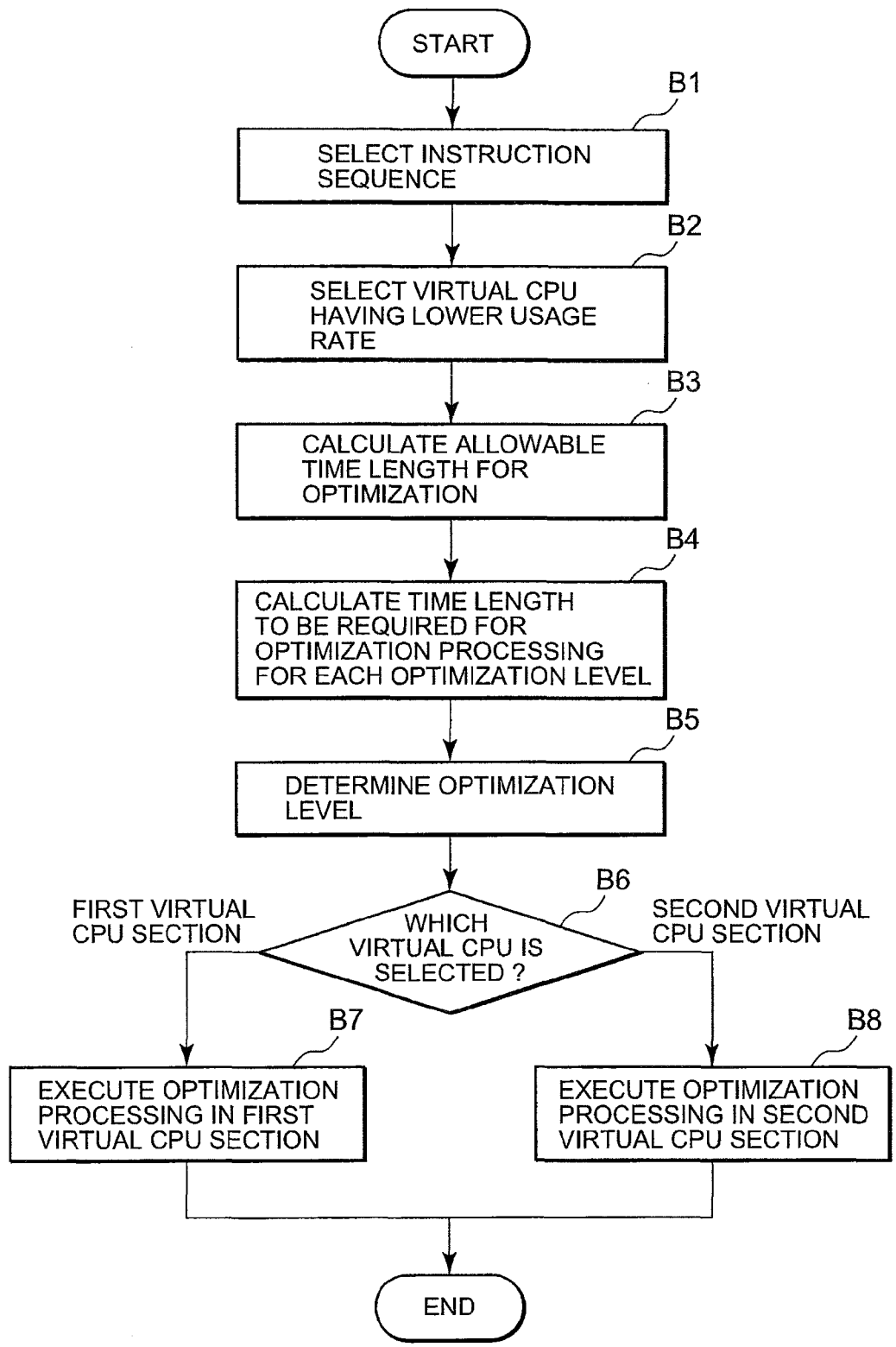
FIG. 4 is a flow chart illustrating operation of the second embodiment of this invention.

Next, with reference to FIG. 3 and a flow chart of FIG. 4, detailed description is given of overall operation of this embodiment.

First, the instruction sequence selecting section 101 selects an instruction sequence to be optimized from among the translated instruction sequences stored in the translated instruction sequence management section 302 (Step B1 of FIG. 4).

Next, the virtual CPU selecting section 102 monitors the first virtual CPU section 201 and the second virtual CPU section 202 to select a virtual CPU having the lower usage rate as a virtual CPU that is to perform the optimization (Step B2).

Next, the time calculation section 104 calculates the allowable time length that can be used for the optimization processing according to the usage rate of the selected virtual CPU and the unit time management section 304 (Step B3).

Further, the time calculation section 104 refers to the optimization processing time management section 305, to thereby calculate a time length to be required for the optimization processing of the specified instruction sequence for each optimization level (Step B4).

Next, the optimization level selecting section 103 determines the highest optimization level from among the optimization levels for which the processing can be completed within the calculated allowable time length, and then gives a direction specifying the selected instruction sequence and optimization level to the selected virtual CPU (Step B5).

Here, in the case where the first virtual CPU section 201 is selected (Step B6), the first virtual CPU section 201 performs the optimization processing of the instruction sequence according to the direction (Step B7).

In the case where the second virtual CPU section 202 is selected, the second virtual CPU section 202 performs the optimization processing according to the direction (Step B8).

According to the second embodiment of this invention, there is employed a configuration in which the optimization level is determined in consideration of a time length to be required for the optimization processing in addition to the usage rate of the virtual CPU. Therefore, it is possible to further reduce the possibility that the essential processing of translating/executing an instruction sequence is delayed on the virtual CPU selected for performing the optimization processing.

Third Embodiment

Next, with reference to the drawings, detailed description is given of a third embodiment of this invention.

Figure 5:
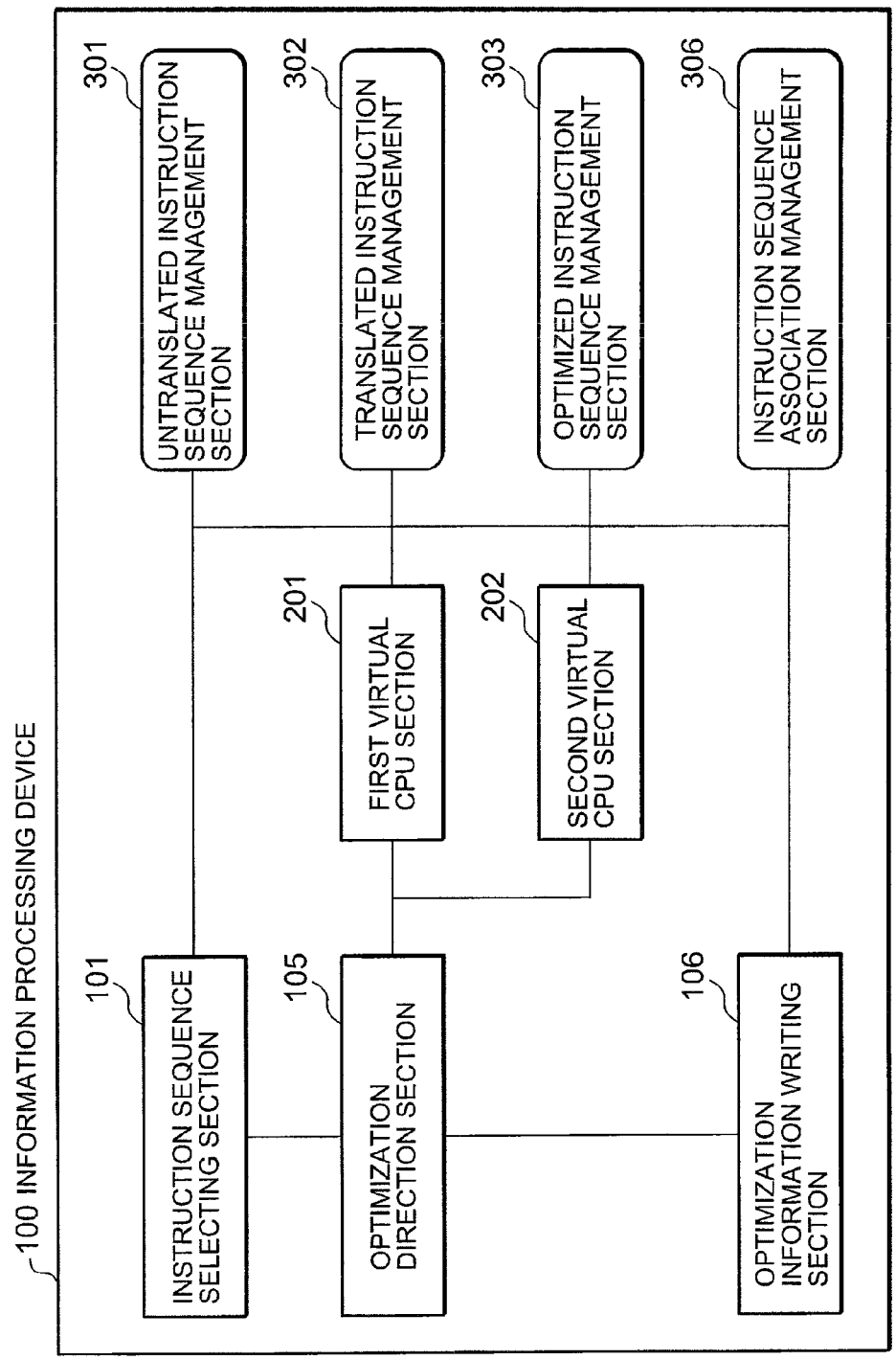
FIG. 5 is a block diagram illustrating a configuration of a third embodiment of this invention.

With reference to FIG. 5, this embodiment is different from the first embodiment in that the virtual CPU selecting section 102 and the optimization level selecting section 103 are not provided, and that an instruction sequence association management section 306, an optimization direction section 105, and an optimization information writing section 106 are provided. However, the rest of the configuration is the same as in the first embodiment. Hence, only differences in configuration are described here.

The instruction sequence association management section 306 is a storage area in which, regarding an untranslated instruction sequence manageable by a virtual CPU, a translated instruction sequence obtained by translating the untranslated instruction sequence into an instruction sequence having a format executable on a physical CPU, and an optimized instruction sequence generated by subjecting the translated instruction sequence to the optimization processing, based on an identifier associated with the untranslated instruction sequence, the translated instruction sequence and the optimized instruction sequence corresponding to that instruction sequence are associated with each other.

The optimization direction section 105 gives the respective virtual CPU sections directions to perform the optimization processing of a selected instruction sequence. On this occasion, the optimization direction section 105 gives the respective virtual CPU sections directions specifying different optimization levels from one another based on the usage rates of the respective virtual CPU sections. As a method of specifying the optimization level, for example, a lower optimization level may be specified for a virtual CPU section having a higher usage rate whereas a higher optimization level may be specified for a virtual CPU section having a lower usage rate. With this configuration, different optimized instruction sequences are generated for an identical translated instruction sequence from one virtual CPU section to another.

When the optimization processing is finished by a virtual CPU section, the optimization information writing section 106 writes information on the optimized instruction sequence into the instruction sequence association management section 306 in association with the translated instruction sequence that is a source of the optimized instruction sequence. It should be noted that the optimization information writing section 106 also writes information on the optimization level selected in the optimization processing.

Figure 6:
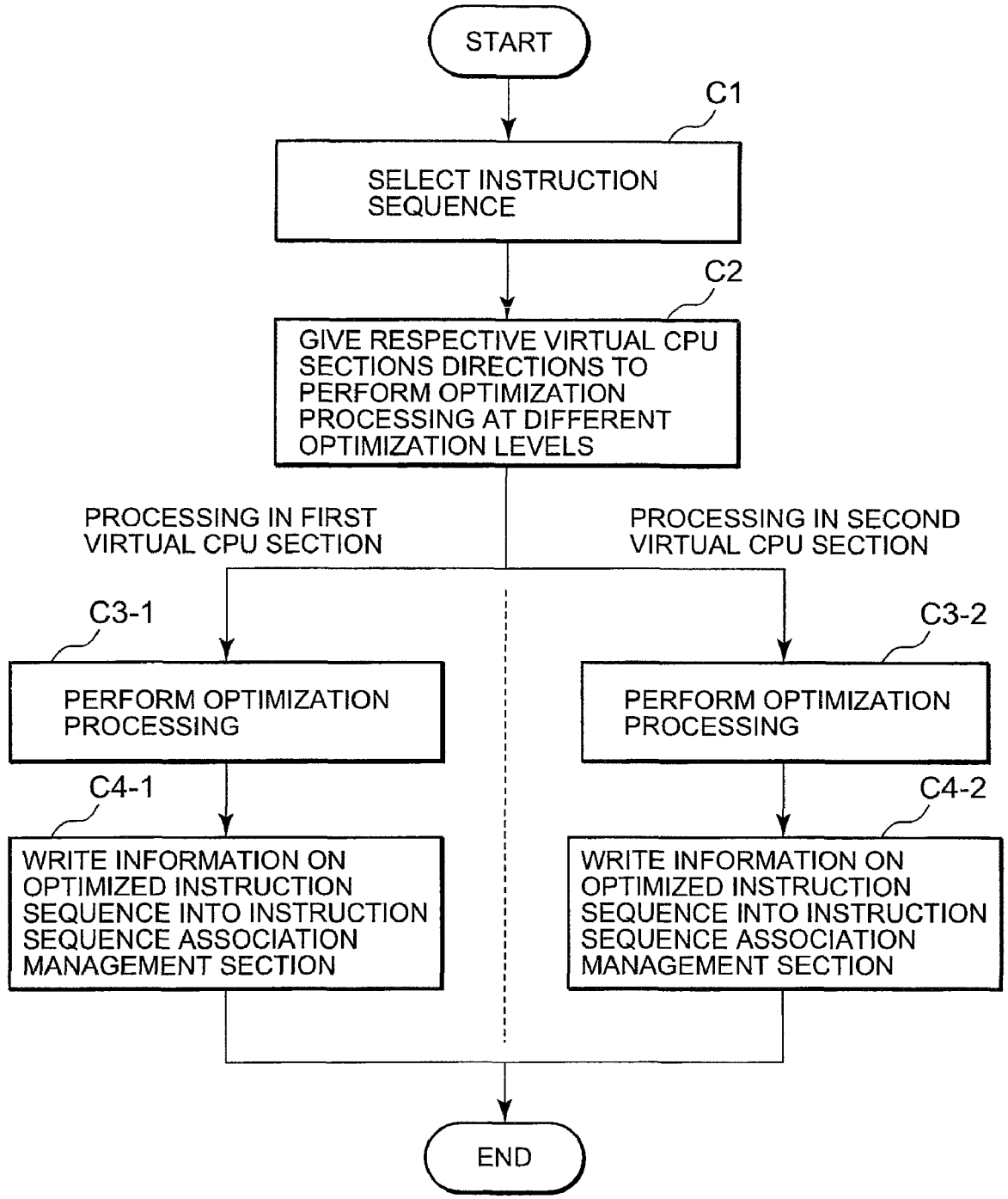
FIG. 6 is a flow chart illustrating operation of the third embodiment of this invention.

Next, with reference to FIG. 5 and a flow chart of FIG. 6, detailed description is given of overall operation of this embodiment.

First, the instruction sequence selecting section 101 selects an instruction sequence to be optimized from among the translated instruction sequences stored in the translated instruction sequence management section 302 (Step C1 of FIG. 6).

Next, the optimization direction section 105 gives the respective virtual CPU sections the directions to perform the optimization processing of the translated instruction sequence for which different optimization levels have been selected based on the usage rates (Step C2).

In response to this, the first virtual CPU section 201 performs the optimization processing according to the translated instruction sequence and optimization level thus specified (Step C3-1).

After the optimization processing is finished, the optimization information writing section 106 writes information on the optimized instruction sequence into the instruction sequence association management section 306 (Step C4-1).

Further, the second virtual CPU section 202 also performs the optimization processing according to the translated instruction sequence and optimization level thus specified (Step C3-2).

After the optimization processing is finished, the optimization information writing section 106 writes information on the optimized instruction sequence into the instruction sequence association management section 306 (Step C4-2).

According to the third embodiment of this invention, there is employed a configuration in which a plurality of virtual CPU sections are given the directions to perform the optimization processing with different optimization levels, and, every time one of the virtual CPU sections finishes the optimization processing, information on the optimized instruction sequence is written into the instruction sequence association management section 306. With this configuration, even when there occurs a necessity to perform instruction sequence execution processing for an instruction sequence that is being subjected to the optimization processing while the optimization processing is performed, an instruction sequence having the highest optimization level at this point can be used for the execution processing based on the information written in the instruction sequence association management section 306.

Examples

First Example

Figure 7:
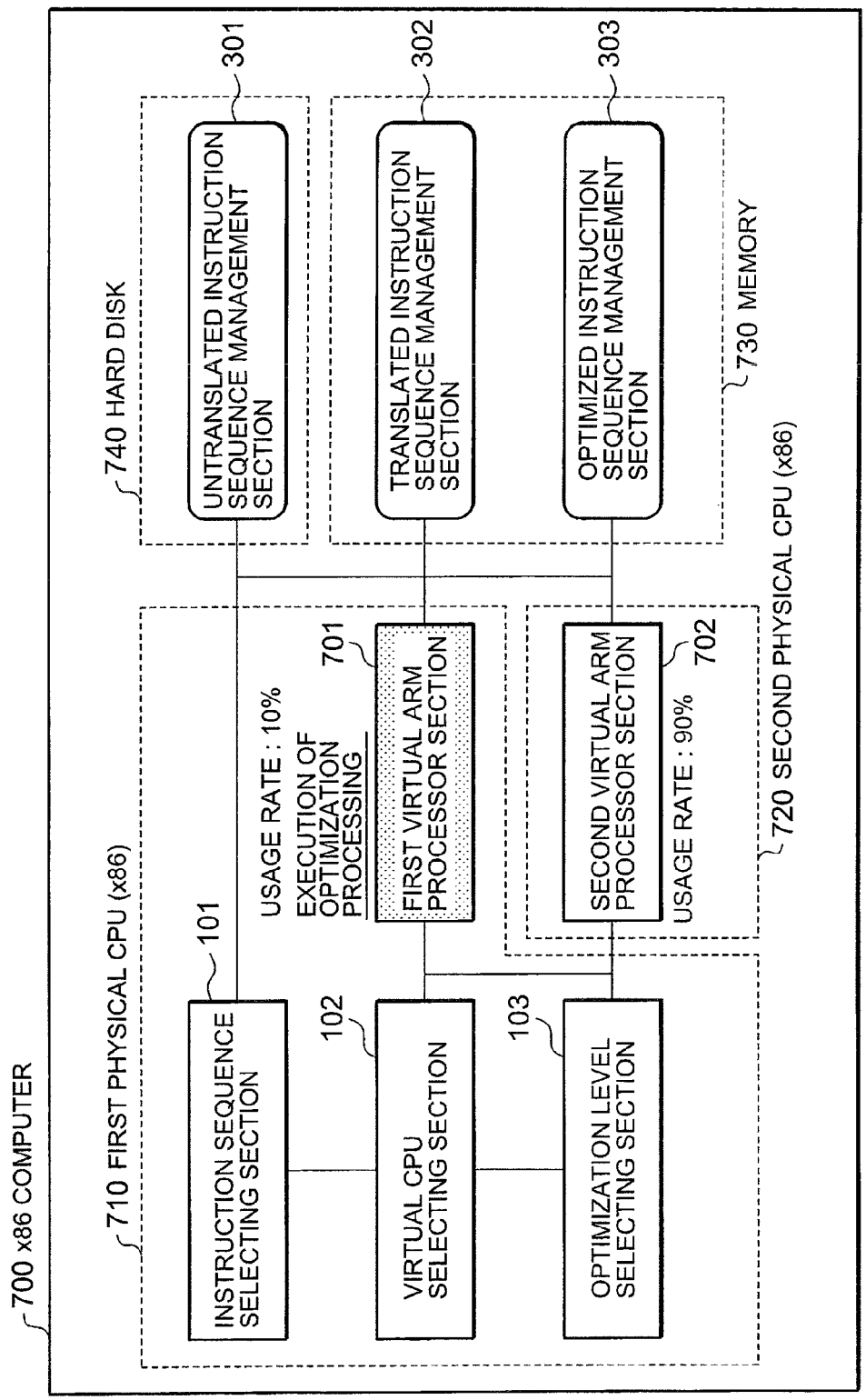
FIG. 7 is a block diagram illustrating a first example of this invention.

Next, with reference to FIG. 7, description is given of a first example of this invention. This example corresponds to the first embodiment of this invention.

As illustrated in FIG. 7, this example relates to a CPU emulation system for an ARM processor operated on an x86 computer 700. In this example, the x86 computer 700, a first virtual ARM processor section 701, and a second virtual ARM processor section 702 correspond to the information processing device 100, the first virtual CPU section 201, and the second virtual CPU section 202 according to the first embodiment of this invention, respectively.

Further, the instruction sequence selecting section 101, the virtual CPU selecting section 102, the optimization level selecting section 103, and the first virtual ARM processor section 701 are executed on a first physical CPU 710 whereas the second virtual ARM processor section 702 is executed on a second physical CPU 720. Further, the translated instruction sequence management section 302 and the optimized instruction sequence management section 303 are located in a memory 730. Further, the untranslated instruction sequence management section 301 is located in a hard disk 740.

In the CPU emulation system having such a configuration as described above, an ARM-format instruction sequence stored in the untranslated instruction sequence management section 301 is read by the first virtual ARM processor section 701 and the second virtual ARM processor section 702, and then, the ARM-format instruction sequence is translated into an x86-format instruction sequence, which is subsequently executed.

Further, the translated instruction sequence is cached in the translated instruction sequence management section 302 of the memory managed by the CPU emulation system. This is because instruction sequences translated into the x86 format contain an instruction sequence that is repeatedly executed, such as in loop processing.

In the CPU emulation system, after the instruction sequence selecting section 101 selects a translated instruction sequence for executing the optimization processing, the optimization processing is performed. For example, in a case where the usage rate of the first virtual ARM processor section 701 is 10% and the usage rate of the second virtual ARM processor section 702 is 90%, the optimization processing is performed by the first virtual ARM processor section 701 having the lower usage rate. Therefore, compared to a case in which the optimization processing is performed by the second virtual ARM processor section 702 having the higher usage rate, the processing of translating and executing an instruction sequence can be executed without delay.

Second Example

Figure 8:
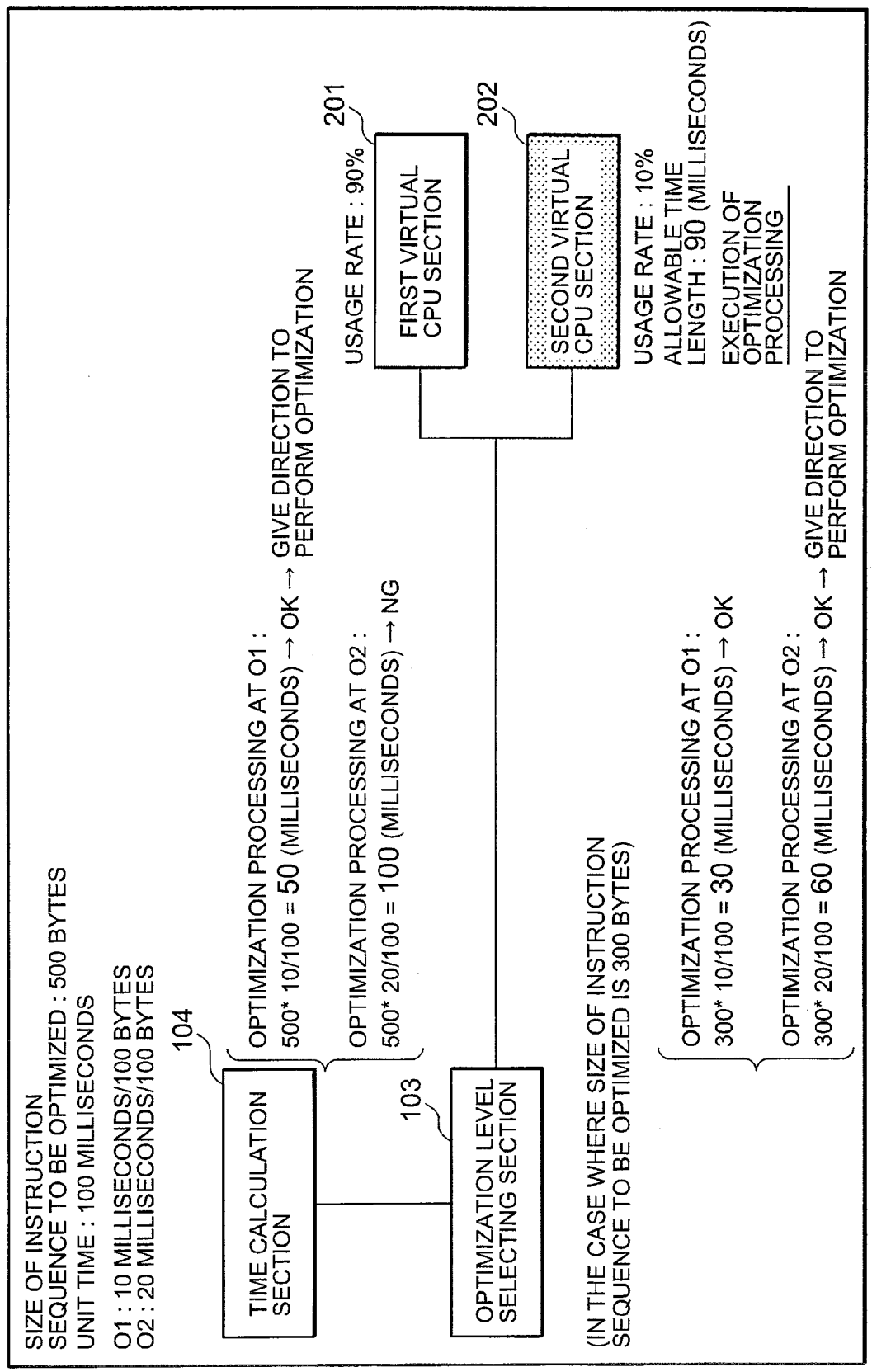
FIG. 8 is a diagram illustrating how a time length is calculated and how an optimization level is selected according to a second example of this invention.

Next, with reference to FIG. 8, description is given of a second example of this invention. This example corresponds to the second embodiment of this invention.

In this example, detailed description is given of a method of selecting a virtual CPU that is to execute the optimization processing, which is used within the CPU emulation system illustrated in the first example.

First, a situation as illustrated in FIG. 8 is assumed. That is, the usage rate of the first virtual CPU section 201 is 90% and the usage rate of the second virtual CPU section 202 is 10%. Further, a translated instruction sequence to be optimized is 500 bytes. Further, the unit time management section 304 (see FIG. 3) stores 100 milliseconds as the unit time. Further, the optimization processing time management section 305 (see FIG. 3) stores information indicating that: (1) the optimization processing for the optimization level O1 takes 10 milliseconds for each instruction sequence of 100 bytes; and (2) the optimization processing for the optimization level O2 takes 20 milliseconds for each instruction sequence of 100 bytes.

Under such a condition, the virtual CPU selecting section 102 (see FIG. 3) selects the second virtual CPU section 202 having the lower usage rate as the virtual CPU that is to execute the optimization processing.

Next, based on the assumption that the unit time is 100 milliseconds and the usage rate of the second virtual CPU section 202 is 10%, the time calculation section 104 (see FIG. 3) determines through calculation that the allowable time length for the optimization processing is 90 milliseconds. Based on the assumption that the translated instruction sequence to be optimized is 500 bytes, the time calculation section 104 determines through calculation that it takes 50 milliseconds in the case of the optimization at the optimization level O1 and that it takes 100 milliseconds in the case of the optimization at the optimization level O2.

Based on the calculation result thus obtained by the time calculation section 104, the optimization level selecting section 103 determines to cause the second virtual CPU section 202 to execute the optimization processing at the optimization level O1, and then requests the second virtual CPU section 202 to perform the optimization processing.

Here, if the translated instruction sequence to be optimized is 300 bytes, the optimization processing can be completed within the allowable time length even at the optimization level O2. Accordingly, the optimization level selecting section 103 requests the second virtual CPU section 202 to perform the optimization processing at the optimization level O2.

Third Example

Figure 9:
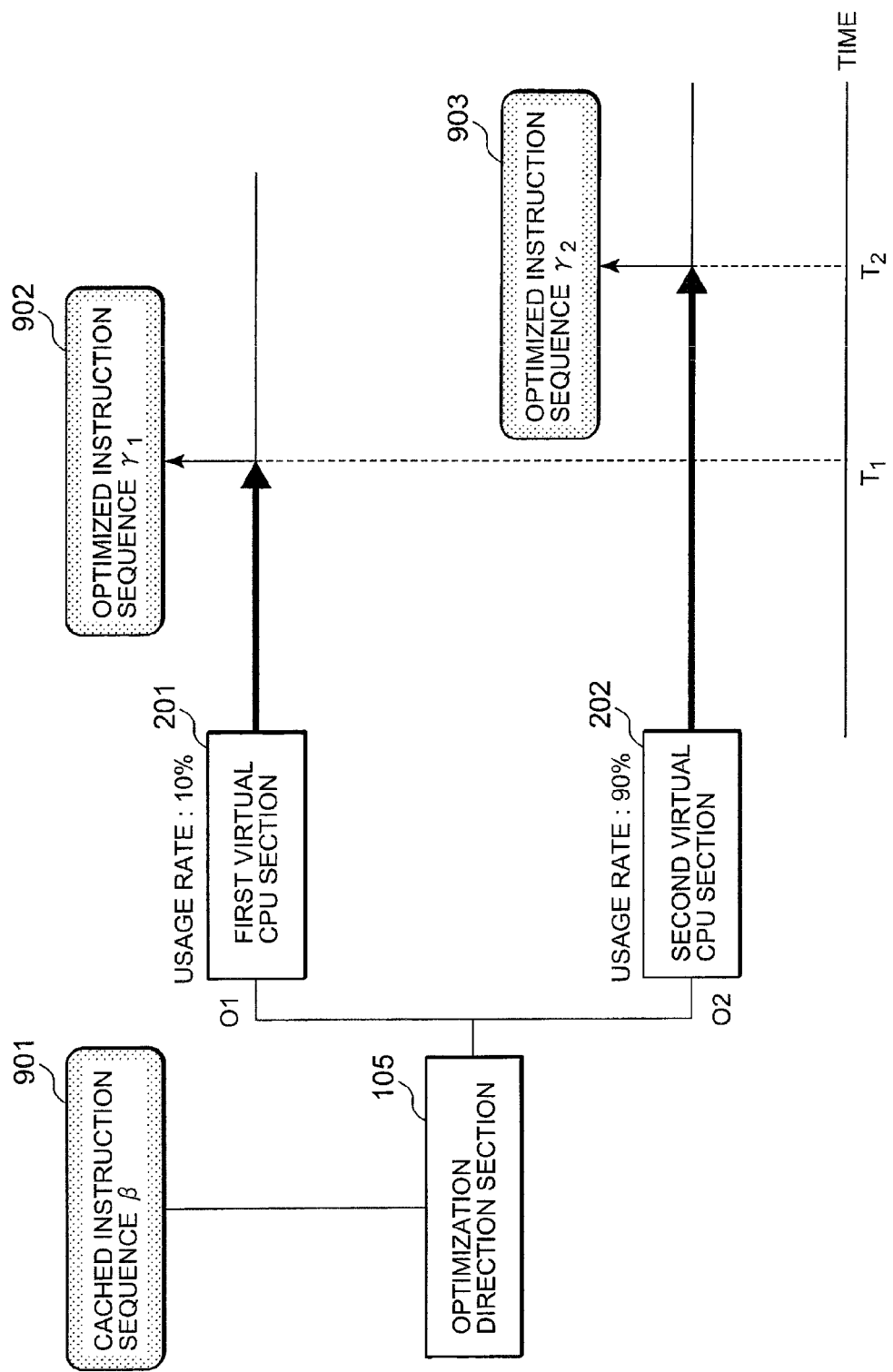
FIG. 9 is a diagram illustrating how an optimized instruction sequence is selected according to a third example of this invention.

Next, with reference to FIGS. 9 and 10, description is given of a third example of this invention. This example corresponds to the third embodiment of this invention.

In this example, detailed description is given of a method of making a request for the optimization processing and a method of selecting, at the time of execution, an optimized instruction sequence, which are used within the CPU emulation system illustrated in the first example.

First, a situation as illustrated in FIG. 9 is assumed. That is, the usage rate of the first virtual CPU section 201 is 10%, and the usage rate of the second virtual CPU section 202 is 90%. Further, on the occasion of optimizing a translated instruction sequence β (cached instruction sequence β 901) obtained by translating an untranslated instruction sequence α, the optimization direction section 105 (see FIG. 5) gives the first virtual CPU section 201 and the second virtual CPU section 202 directions to perform the optimization at the optimization levels O1 and O2, respectively. It is assumed that, as a result, the respective optimization processings are completed at time points $T_1$ and $T_2$, respectively, and that optimized instruction sequences $\gamma_1$ 902 and $\gamma_2$ 903 are generated, respectively.

During a period between $T_1$ and $T_2$, the generation of the optimized instruction sequences is completed only for $\gamma_1$, and hence the instruction sequences are associated in the instruction sequence association management section 306 (see FIG. 5) as illustrated in FIG. 10A. Here, in the CPU emulation system, if the instruction sequence execution processing is performed for the instruction sequence a, the instruction sequence association management section 306 (see FIG. 5) is referred to, and then, it is understood that the optimized instruction sequence $\gamma_1$ having the highest optimization level needs to be executed.

Further, after $T_2$, the generation of the optimized instruction sequence $\gamma_2$ is also completed, and hence the instruction sequences are associated in the instruction sequence association management section 306 as illustrated in FIG. 10B. Here, in the CPU emulation system, if the instruction sequence execution processing is performed for the instruction sequence a, the instruction sequence association management section 306 (see FIG. 5) is referred to, and then, it is understood that the optimized instruction sequence $\gamma_2$ having the highest optimization level needs to be selected.

It should be noted that, in the above-mentioned examples, a CPU emulation system using two physical CPUs is assumed. However, a CPU emulation system having three or more physical CPUs may also be employed. Further, a CPU emulation system using one or more multi-core CPUs may also be employed.

According to this invention, a virtual CPU having a high usage rate is not given a direction to perform the optimization processing, and hence the essential processing of translating and executing an instruction sequence can be executed without delay. In other words, it is possible to shorten a time length for executing a program that is to be emulated. This is because this invention employs such a configuration that a virtual CPU that is to perform the optimization processing is selected based on the usage rates of virtual CPUs.

This invention can be applied for the purpose of performing, in a CPU emulation system in which a CPU having a different ISA from that of a physical CPU is software-emulated, the optimization processing of a cached instruction sequence while maintaining processing throughput of the virtual CPU as much as possible.

Hereinabove, detailed description has been given of this invention made by the inventor of the present application with reference to the embodiments. However, it should be understood that this invention is not limited to the above-mentioned embodiments, and that various modifications may be made without departing from the spirit and scope of this invention.

What is claimed is:

1. A CPU emulation system, comprising:
an information processing device comprising;
 a plurality of virtual CPUs each operating on a different physical CPU;
 a unit time management section for storing a given time length as a unit of time;
 an optimization processing time management section for storing a time length required for the optimization processing for each optimization level, the optimization processing time management section storing the processing time length according to a size of the instruction sequence for the each optimization level;
 an instruction sequence selecting section for selecting an instruction sequence to be optimized from among a translated instruction sequence;
 a virtual CPU selecting section for selecting one of the plurality of virtual CPUs to perform optimization processing of the selected instruction sequence, based on lowest usage rates of the plurality of virtual CPUs;
 a time calculation section for calculating an allowable time length to perform the optimization processing based on the lowest usage rate of the one of the plurality of virtual CPUs selected by the virtual CPU selecting section, and the unit time stored in the unit time management section, and calculating, for each optimization level, a time length to be required for the optimization processing of the instruction sequence, using the time length stored by the optimization processing time management section; and
 an optimization level selecting section for determining an optimization level of the optimization processing and giving command to the selected one of the plurality of virtual CPUs using the determined optimization level, the optimization level selecting section determining a highest optimization level from among the optimization levels for which the processing can be completed within the calculated allowable time length, based on the required time length calculated for each optimization level.

2. The CPU emulation system according to claim 1, wherein the plurality of virtual CPUs are each executed on a different CPU core.

3. A CPU emulation method, comprising:
storing a given time length as a unit of time;
storing a time length required for the optimization processing for each optimization level, the processing time length required for the optimization processing being stored according to a size of the instruction sequence for the each optimization level;
selecting an instruction sequence to be optimized from among a translated instruction sequence;
selecting, based on lowest usage rates of a plurality of virtual CPUs each operating on a different physical CPU, one of the plurality of virtual CPUs, to perform optimization processing of the selected instruction sequence;
calculating an allowable time length to perform the optimization processing based on the lowest usage rate of the selected one of the plurality of virtual CPUs and the unit time;
calculating a time length to be required for the optimization processing of the instruction sequence for each optimization level using the time length stored by an optimization processing time management section;
determining an optimization level of the optimization processing, a highest optimization level from among the optimization levels for which the processing can be completed within the calculated allowable time length, based on the required time length calculated for each optimization level; and
giving a command to the selected one of the plurality of virtual CPUs using the determined optimization level.

4. A non-transitory computer readable recording medium having a CPU emulation program recorded thereon, the CPU emulation program causing a computer to execute the processing of:
storing a given time length as a unit of time
storing a time length required for the optimization processing for each optimization level, the processing time length required for the optimization processing being stored according to a size of the instruction sequence for the each optimization level;
selecting an instruction sequence to be optimized from among a translated instruction sequence;
selecting, based on lowest usage rates of a plurality of virtual CPUs each operating on a different physical CPU, one of the plurality of virtual CPUs to perform optimization processing of the selected instruction sequence;
calculating an allowable time length to perform the optimization processing based on the lowest usage rate of the selected one of the plurality of virtual CPUs and the unit time;
calculating a time length to be required for the optimization processing of the instruction sequence for each optimization level using the time length stored by an optimization processing time management section;
determining an optimization level of the optimization processing, a highest optimization level from among the optimization levels for which the processing can be completed within the calculated allowable time length, based on the required time length calculated for each optimization level; and
giving a command to the selected one of the plurality of virtual CPUs to perform the optimization processing using the determined optimization level of the optimization processing.

* * * * *